US010108798B1

(12) United States Patent
Friedman et al.

(10) Patent No.: US 10,108,798 B1
(45) Date of Patent: Oct. 23, 2018

(54) METHODS AND SYSTEMS FOR DEFENDING AGAINST CYBER-ATTACKS

(71) Applicant: SMART INFORMATION FLOW TECHNOLOGIES LLC, Minneapolis, MN (US)

(72) Inventors: Scott Ehrlich Friedman, Minneapolis, MN (US); David John Musliner, Plymouth, MN (US); Peter Kelly Keller, Saint Paul, MN (US)

(73) Assignee: SMART INFORMATION FLOW TECHNOLOGIES LLC, Minneapolis, MN (US)

( * ) Notice: Subject to any disclaimer, the term of this patent is extended or adjusted under 35 U.S.C. 154(b) by 55 days.

(21) Appl. No.: 14/987,375

(22) Filed: Jan. 4, 2016

(51) Int. Cl.
G06F 21/56 (2013.01)
G06F 8/52 (2018.01)

(52) U.S. Cl.
CPC ............... *G06F 21/56* (2013.01); *G06F 8/52* (2013.01)

(58) Field of Classification Search
CPC ....... G06F 21/51; G06F 21/52; H04L 63/1441
USPC ........ 726/20–25; 713/150–152; 77/106, 136; 707/106, 136
See application file for complete search history.

(56) References Cited

U.S. PATENT DOCUMENTS

| 5,822,590 | A | 10/1998 | Gupta |
| 5,838,977 | A | 11/1998 | Gupta |
| 7,240,341 | B2 | 7/2007 | Plummer et al. |
| 8,104,021 | B2 | 1/2012 | Erlingsson et al. |
| 8,381,175 | B2 * | 2/2013 | Chabbi ............... G06F 11/0751 717/106 |
| 8,510,723 | B2 * | 8/2013 | Barua ...................... G06F 8/52 717/136 |

(Continued)

FOREIGN PATENT DOCUMENTS

| WO | 2015023502 A1 | 2/2015 |
| WO | 2015073450 A1 | 5/2015 |

OTHER PUBLICATIONS

Giuffrida et al. "Enhanced Operating System Security Through Efficient and Fine-Grained Address Space Randomization.", available at www.usenix.org/system/files/conference/usenixsecurity12/sec12-final181.pdf (16 pages).

(Continued)

*Primary Examiner* — Morshed Mehedi
*Assistant Examiner* — Viral S Lakhia
(74) *Attorney, Agent, or Firm* — JoAnn M. Seaton; Griffiths & Seaton PLLC

(57) ABSTRACT

Methods, systems, and computer-readable storage medium including a computer program product for defending against cyber-attacks are provided. One method includes receiving, by a processor, program code and automatically generating a chronomorphic binary for the program code. The method further includes storing the chronomorphic binary in an executable memory space and diversifying the executable memory space for the chronomorphic binary during runtime of the program code. A system includes memory configured for storing a defense module and a processor connected to the memory. The processor, when executing the defense module, is configured for performing the above-referenced method. One computer program product includes computer code for performing the above-referenced method.

17 Claims, 6 Drawing Sheets

(56) References Cited

U.S. PATENT DOCUMENTS

| | | | | |
|---|---|---|---|---|
| 8,510,827 | B1* | 8/2013 | Leake | G06F 12/1416 726/22 |
| 8,522,225 | B2 | 8/2013 | Chen et al. | |
| 8,627,051 | B2 | 1/2014 | Chen et al. | |
| 8,631,225 | B2 | 1/2014 | Chen et al. | |
| 8,713,548 | B2 | 4/2014 | Chen et al. | |
| 9,058,492 | B1* | 6/2015 | Satish | G06F 21/50 |
| 9,250,937 | B1* | 2/2016 | Franz | G06F 9/45516 |
| 9,747,448 | B2* | 8/2017 | Livshits | G06F 21/57 |
| 2007/0285271 | A1* | 12/2007 | Erlingsson | G06F 12/1441 340/815.84 |
| 2012/0198169 | A1* | 8/2012 | Chen | G06F 9/3806 711/125 |
| 2014/0281354 | A1* | 9/2014 | Tkacik | G06F 12/1009 711/206 |
| 2015/0143452 | A1* | 5/2015 | Hamlen | G06F 21/51 726/1 |
| 2016/0026791 | A1* | 1/2016 | Melski | G06F 21/54 726/25 |
| 2016/0092674 | A1* | 3/2016 | Hughes | G06F 21/52 726/22 |
| 2016/0092675 | A1* | 3/2016 | Vidrine | G06F 21/52 726/22 |
| 2016/0212159 | A1* | 7/2016 | Gupta | G06F 21/54 |
| 2016/0299765 | A1* | 10/2016 | Wesie | G06F 9/4401 |
| 2016/0381043 | A1* | 12/2016 | Yamada | H04L 63/1425 726/23 |
| 2017/0206357 | A1* | 7/2017 | Gorelik | G06F 21/566 |

OTHER PUBLICATIONS

Gupta, A., Kerr, S., Kirkpatrick, M. S. & Bertino, E. (2013). Marlin: A tine grained randomization approach to defend against ROP attacks. Network and System Security, 293-306. Springer Berlin Heidelberg (14 pages).

Bittau, A., Belay, A., Mashtizadeh, A., et al. (May 2014). Hacking blind. 2014 IEEE Symposium on Security and Privacy (SP), 227-242. IEEE (16 pages).

Larsen, P., Homescu, A., Brunthaler, S. & Franz, M. (May 2014). Sok: Automated software diversity. 2014 IEEE Symposium on Security and Privacy (SP), 276-291. IEEE (16 pages).

Wartell, R., Mohan, V., Hamlen, K. W. & Lin, Z. (Oct. 2012). Binary stirring: Self-randomizing instruction addresses of legacy x86 binary code. Proceedings of the 2012 ACM conference on Computer and communications security, 157-168. ACM (12 pages).

Pappas, V., Polychronakis, M. & Keromytis, A. D. (May 2012). Smashing the gadgets: Hindering return-oriented programming using in-place code randomization. 2012 IEEE Symposium on Security and Privacy (SP), 601-615. IEEE (15 pages).

Mohan, V., Larsen, P., Brunthaler, S., et al. (2015). Opaque control-flow integrity. Symposium on Network and Distributed System Security (NDSS) (15 pages).

Jeehong, K., Inhyeok, K., Changwoo, M. & Eom, Y. (2014). Zero-sum defender: Fast and space-efficient defense against return-oriented programming attacks. IEICE Transactions on Fundamentals of Electronics, Communications and Computer Sciences, 97(1), 303-305 (3 pages).

(2014). Defend against blind ROP. Retrieved from http://security.stackexchange.com/questions/58388/defend-against-blind-rop (3 pages).

* cited by examiner

METHODS AND SYSTEMS FOR DEFENDING AGAINST CYBER-ATTACKS

STATEMENT REGARDING FEDERALLY SPONSORED RESEARCH OR DEVELOPMENT

This invention was made with government support under contract number FA8750-14-C-0093 awarded by the Defense Advanced Research Projects Agency and Air Force Research Laboratory. The government has certain rights in the invention.

BACKGROUND OF THE INVENTION

Years ago, cyber attackers only needed to find a buffer overflow or other vulnerability and use it to upload their exploitable instructions, then make the program execute those new instructions. To counter this broad vulnerability, modern operating systems enforce "write XOR execute" (WX) defenses. That is, memory is marked as either writable or executable, but not both. So exploit code that is uploaded to writable memory cannot be executed. Not surprisingly, attackers then developed a more sophisticated exploitation method.

Computer instruction sets are densely packed into a small number of bits, so accessing those bits in ways that a programmer did not originally intend can yield gadgets (i.e., groups of bits that form valid program instructions that can be strung together by an attacker to execute arbitrary attack code from an otherwise harmless program). Known as Return Oriented Programming (ROP), these types of cyber exploits have been effective and commonplace since the widespread deployment of WX defenses. Software with a single small buffer-overflow vulnerability can be hijacked into performing arbitrary computations using ROP techniques. Hackers have even developed ROP compilers that build the ROP exploits automatically by finding gadgets in the binary of a vulnerable target and stringing those gadgets together to implement the attacker's code. To counteract various software diversity defenses that try to move the gadgets around so that a previously-compiled ROP attack will fail, attackers have developed Blind ROP (BROP) attacks that perform automated reconnaissance to find the gadgets in a running program.

Various defense methods have been developed to try to foil code reuse exploits such as ROP and BROP. Some of defenses instruct binaries to change their execution semantics or automatically filter program input to prevent exploits. However, these approaches require process-level virtual machines or active monitoring by other processes, which incur a comparatively high overhead. Other approaches separate and protect exploitable data (e.g., using shadow stacks), but such approaches also incur comparatively high overhead.

To reduce overhead and to maintain compatibility with existing operating systems and software architectures, many researchers have focused on lightweight, diversity-based techniques to prevent code reuse exploits. For example, Address Space Layout Randomization (ASLR) is common in modern operating systems.

ASLR techniques function by loading program modules into different locations each time the software is started. However, ASLR does not randomize the location of the instructions within modules that have been previously loaded, so these programs are still vulnerable to ROP attacks.

Some diversity techniques modify the binaries themselves to make them less predictable by an attacker. For example: 1) compile-time diversity produces semantically equivalent binaries with different structures; 2) offline code randomization transforms a binary on disk into a functionally equivalent variant with different bytes loaded into memory; and 3) load-time code randomization makes the binary load blocks of instructions at randomized addresses. These diversity-based approaches incur comparatively lower overhead than other ROP defenses and they offer statistical guarantees against ROP attacks. Unfortunately, these compile-time, offline, and load-time diversity defenses are still susceptible to BROP attacks that perform runtime reconnaissance to map the binary and find gadgets. So even with compile-time, offline, or load-time diversity, programs that run for a significant period of time without being reloaded (e.g., all modern server architectures) are vulnerable.

Other ROP defenses modify the operating system to augment diversity. While these approaches provide promising results, they do not modify existing third-party programs to work on existing operating systems.

Another recent approach uses compile-time diversity in tandem with hardware-based enforcement mechanism that prevents adversaries from reading any code. This approach protects against memory disclosure and thereby prevents ROP and BROP attacks; however, like the above techniques, this approach requires modifying the underlying operating system or hardware.

Some runtime techniques clone executable elements in memory and toggle between them during runtime so that the attacker is unaware of which memory layout is currently executing; however, the diversity factor is not as high as the above approaches. Another recent approach combines execution-time switching with runtime diversification by instrumenting all call, return, and jump instructions. On these instrumented instructions, execution may randomly switch between executable copies while the other copy is diversified by fine-grained ASLR. While this approach prevents varieties of ROP attacks, it incurs significant runtime overhead due to a dynamic binary instrumentation framework, and it doubles the size of the binary due to executable memory cloning. Still other approaches automatically instrument the binary, but they consume a high amount of disk space, memory footprint, and/or performance overhead.

SUMMARY

Various embodiments provide methods, systems, and computer-readable storage medium including a computer program product for defending against cyber-attacks are provided. One method comprises receiving, by a processor, program code and automatically generating a chronomorphic binary (e.g., a binary the changes throughout execution time) for the program code. The method further includes storing the chronomorphic binary in an executable memory space and diversifying the executable memory space for the chronomorphic binary during runtime of the program code.

A system comprises memory configured for storing a defense module and a processor connected to the memory. The processor, when executing the defense module, is configured for receiving program code and automatically generating a chronomorphic binary for the program code. The processor is further configured for storing the chronomorphic binary in an executable memory space and diversifying the executable memory space for the chronomorphic binary during runtime of the program code.

One computer program product for defending against cyber-attacks comprises computer code for receiving, by a processor, program code and computer code for automatically generating a chronomorphic binary for the program code. The computer program product further comprises computer code for storing the chronomorphic binary in an executable memory space and computer code for diversifying the executable memory space for the chronomorphic binary during runtime of the program code.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Unlike the diversity-based protection techniques described above, the chronomorphic program code of the present disclosure utilizes a single instance of the program in memory at any time, making the code more suitable for embedded or real-time systems. The chronomorphic programs disclosed herein diversify themselves throughout program execution to statistically prevent code reuse attacks (e.g., ROP and BROP attacks), even if the attacker knows the memory layout. The runtime costs incurred by the disclosed chronomorphic techniques occurs when actually morphing the program; however, when not morphing the program, the program, for the most part, executes its original instructions. Furthermore, the costs of the morphing behavior can be adjusted and controlled to achieve desired performance levels in the face of changing threat levels, rates of adversary-provided input, and the like. Unlike other approaches, the disclosed chronomorphic programs can run on existing hardware and operating systems, making them suitable for legacy systems.

Furthermore, the chronomorphic programs disclosed herein foil cyber-attacks, including code reuse attacks that rely on the consistency of a program's memory layout since the memory layout changes during execution of the program. As described below, these memory changes should, but do not necessarily, occur early in the processing of each user transaction.

Figure 1:
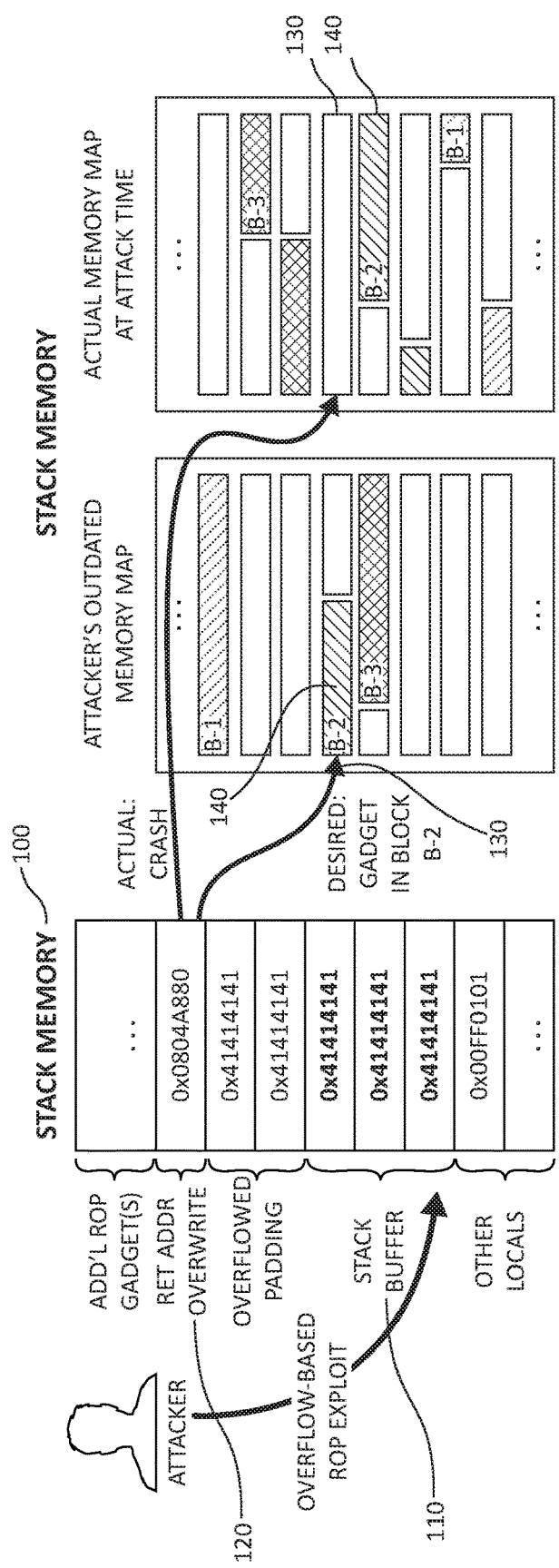
FIG. 1 illustrates an exemplary attempt of a classic stack-overflow-based ROP exploit on a chronomorphic executable.

With reference now to FIG. 1, FIG. 1 illustrates an exemplary attempt of a classic stack-overflow-based ROP exploit on a chronomorphic executable. The attacker overflows a stack buffer 110 in a stack memory 100 to overwrite the return address 120 with one or more addresses 130 including the gadgets 140 (i.e., groups of bits that form valid program instructions that can be strung together by an attacker to execute arbitrary attack code from an otherwise harmless program or exploitable executable memory) that the attacker may have learned by analyzing the executable on disk or by exploiting runtime information leaks. The chronomorphic program (e.g., a program that changes throughout execution time) rewrites itself regularly throughout execution so the attacker's knowledge of the program is outdated. When the program returns to the addresses 130 written by the attacker, the program executes different instructions than those intended by the attacker because the addresses 130 no longer include the gadgets 140 since the gadgets 140 have been moved to addresses 150. The program promptly crashes without executing the exploit. The gray area (i.e., block relocation space) could be comprised of invalid, unexploitable instructions that quickly cause a crash, or alternatively, nop-slides (e.g., an instruction that includes the explicit purpose of not changing the state of any of the registers, status flags, or memory that are accessible by the programmer) into an invocation of alarms or forensic analysis functions that terminate with an error signal, consistent with other software "booby trapping" approaches.

The chronomorph approach described herein changes the machine code at runtime using a self-modifying code (SMC) technique. Using the SMC technique, the chronomorphic preserves the functionality of the underlying program (i.e., maintains the program semantics), maximizes diversity over time, and minimize performance costs. The SMC technique functions by changing the permissions of the target program's memory (i.e., temporarily circumvents the WX defense) to modify the program code layout and then resumes execution of the program code.

Figure 2:
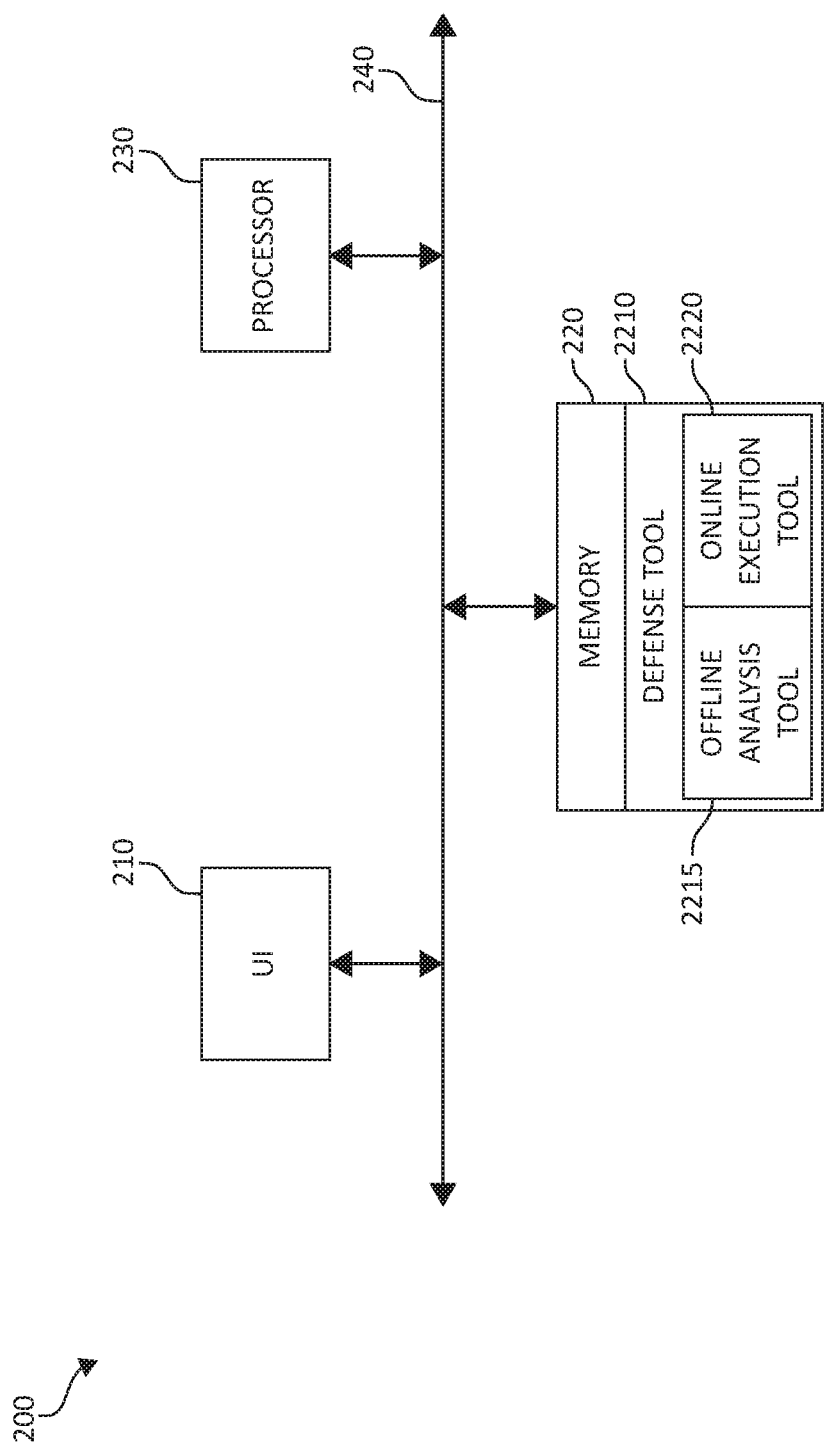
FIG. 2 is a block diagram of one embodiment of a system for defending against cyber-attacks.

With reference now to FIG. 2, FIG. 2 is a block diagram of one embodiment of a system 200 for defending against a cyber-attack. At least in the illustrated embodiment, system 200 comprises a user interface (UI) 210, a memory 220 storing a defense tool 2210, and a processor 230 coupled to and in communication with each other via a bus 240 (e.g., a wired and/or wireless bus).

In various embodiments, UI 210 may be any type of user interface known in the art or developed in the future. That is, UI 210 may be any type of communication system and/or device that enables a user (human and/or mechanical) to introduce program code from a third-party to system 200.

Memory 220 may be any type of computer memory known in the art or developed in the future. That is, memory 220 may be any computer-readable medium capable of storing program instructions comprising defense tool 2210.

Figure 3:
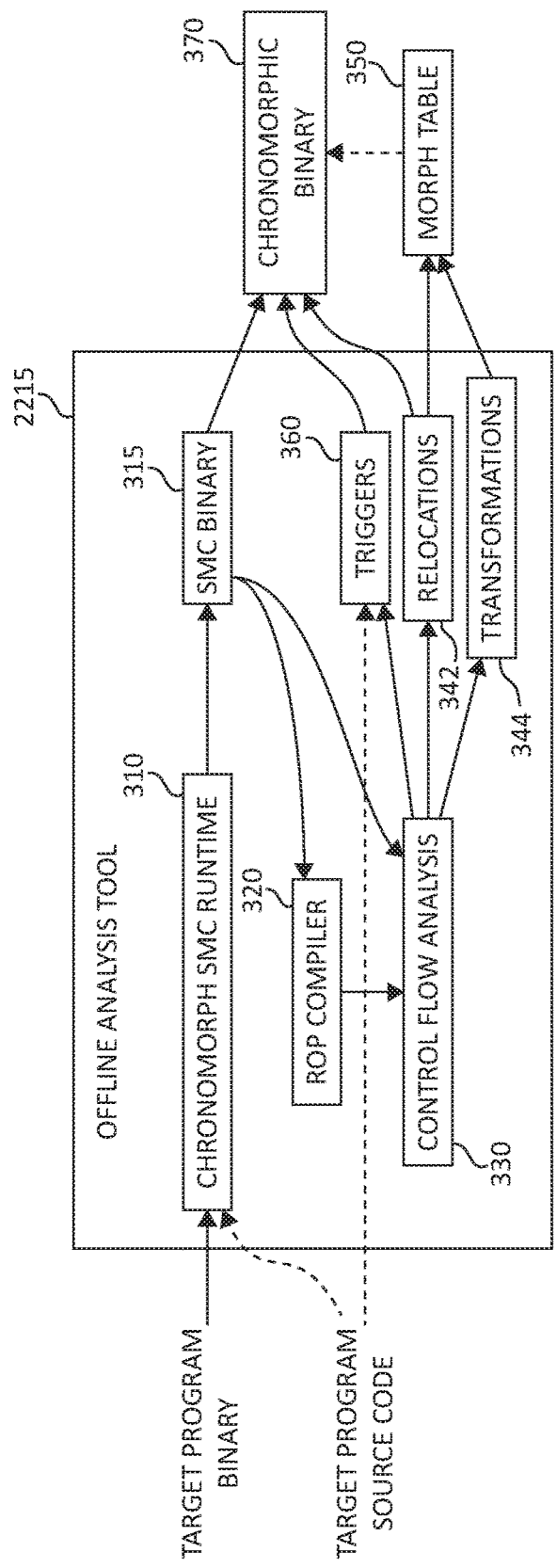
FIG. 3 is a block diagram illustrating an embodiment of converting a target program in a chronomorphic binary.
Figure 4:
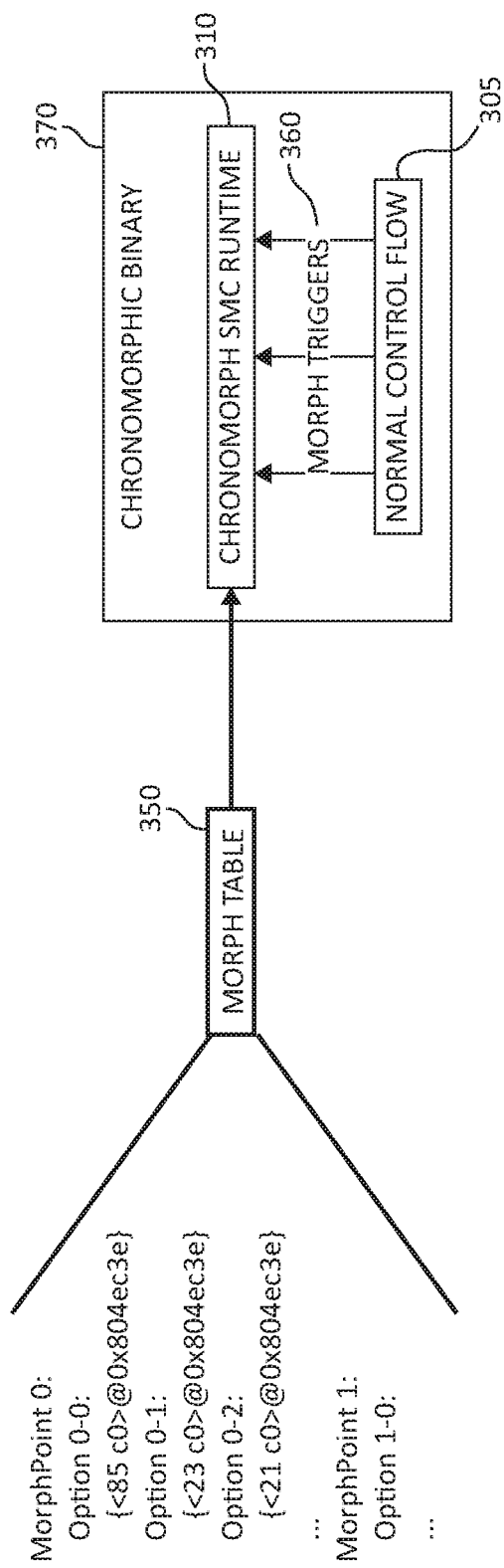
FIG. 4 is a diagram illustrating one embodiment of the chronomorphic binary of FIG. 3 interacting with a morph table.
Figure 5:
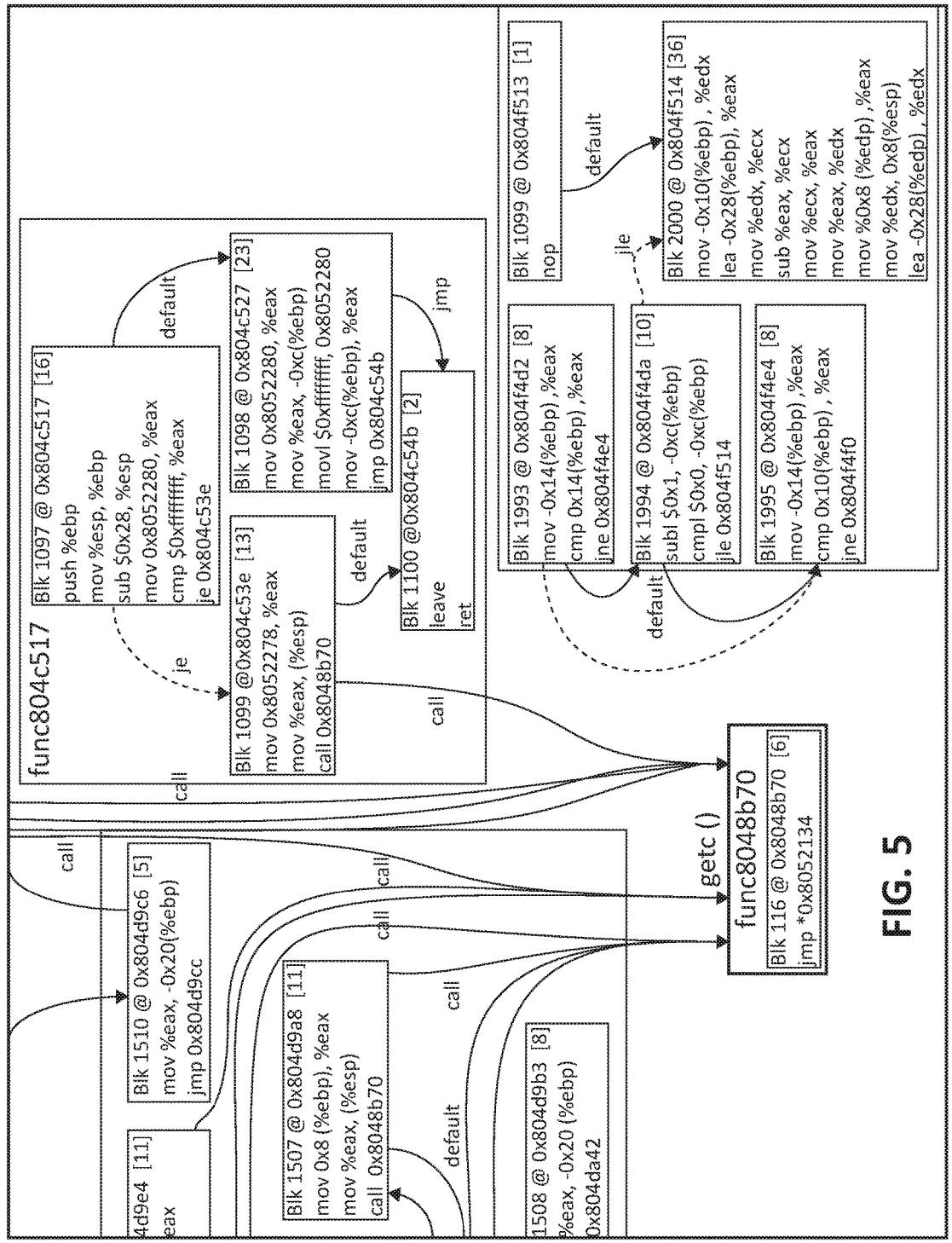
FIG. 5 is one example of a portion of a control flow graph automatically generated by an offline analysis tool.

In one embodiment, defense tool 2210 comprises an offline analysis tool 2215 and an online execution tool 2220 that, in combination, construct one or more chronomorphic binaries from normal third-party programs. Offline analysis tool 2215 comprises computer-executable code for:

1) Transforming the executable to inject a chronomorph SMC runtime that invokes memory permissions (e.g., "mprotect" in Linux® and "VirtualProtect" in Windows®) and rewriting portions of the binary during execution, which produces a SMC binary (block 315 in FIG. 3) with SMC functions that are disconnected from the program's normal control flow (see block 305 in FIG. 4);

2) Analyzing the SMC binary to identify potentially exploitable sequences of instructions (e.g., gadgets) (see block 320 in FIG. 3);

3) Identifying relocatable gadgets and transform the SMC binary to make those gadgets relocatable (see block 330 in FIG. 3);

4) Computing instruction-level, semantics-preserving transforms that make non-relocatable gadgets and surrounding program code of no use to attackers (see blocks 342 and 344 in FIG. 3);

5) Writing the relocations and transforms to a morph table outside the chronomorphic binary (block 350 in FIG. 3); and 6) Injecting morph triggers (e.g., an invocation of the self-modifying code module to diversify executable memory in accordance with the morph table) into the SMC binary so that the program will morph itself periodically (see block 360 in FIG. 3), which produces the chronomorphic binary (block 370 in FIG. 3).

In one various embodiments, before offline analysis tool 2215 can analyze the binary and compute transformations for the third-party program (e.g., a target program), offline analysis tool 2215 injects a chronomorph SMC runtime into the target program. The chronomorph SMC includes functions for modifying memory protection (e.g., mprotect), writing byte sequences to specified addresses, and reading the morph table from outside the binary. These chronomorph functions may themselves include gadgets and have runtime diversification potential, so the SMC-capable binary that includes these functions should be the subject of all further offline analysis.

In one embodiment when the source code of the target program is available, the chronomorph SMC runtime is injected by linking the source code of the target program against the compiled chronomorph SMC runtime. The result of linking the source code of the target program against the compiled chronomorph SMC runtime is a dynamically-linked SMC executable or a statically-linked SMC executable.

In an embodiment when the source code of the target program is unavailable, the chronomorph SMC runtime is injected by rewriting a statically-linked binary by extending the binary with a new loadable, executable segment containing the statically-linked chronomorph SMC runtime. The result of rewriting the statically-linked binary is a statically-linked SMC executable.

In another embodiment in which the source code of the target program is unavailable, the chronomorph SMC runtime is injected by rewriting a dynamically-linked binary by adding chronomorph procedures to an alternative procedure linkage table and adding objects to a global object table. The binary is then extended with a new loadable, executable segment containing the dynamically-linked chronomorph SMC runtime to produce a dynamically-linked SMC executable.

Each of these three embodiments inject the chronomorph SMC runtime into the target program to produce a SMC binary. With the SMC binary created, offline portion 2215 analyzes the target program for potentially exploitable sequences of instructions or gadgets.

Offline analysis tool 2215, in one embodiment, comprises a third-party ROP compiler that automatically identifies available gadgets within a given binary and creates an exploit of the user's choice (e.g., execute an arbitrary shell command) by compiling a sequence of attack gadgets from the available gadgets, if possible. During operation, offline analysis tool 2215 runs the ROP compiler against the SMC binary to find gadgets that span the entire executable segment, including the chronomorph SMC runtime.

The ROP compiler results are used to prioritize the diversification efforts to allocate time and computing resources proportional to the various exploitation threats within the binary as follows:

1) Attack gadgets (e.g., gadgets that can be chained together to form an attack sequence) are given the highest priority. The chronomorphic binary addresses attack gadgets with the highest-diversity transforms;

2) Available gadgets (e.g., gadgets found by the ROP compiler, but are not present in an attack sequence) are given medium priority. The chronomorphic binary addresses available gadgets with the highest-diversity transforms, but within acceptable performance bounds; and 3) Instructions that have not been linked to an available gadget are given the lowest priority, but are still diversified when feasible. Since zero-day gadgets and new code-reuse attack strategies may arise after transformation time, this diversification offers additional security.

Offline analysis tool 2215 performs all possible transformations of potentially dangerous gadgets. In one embodiment, offline analysis tool 2215 saves costlier transformations (e.g., dynamic block relocations) for the high-risk attack gadgets. That is, in this embodiment the costlier transformations are not performed on non-attack gadgets (i.e., available gadgets and instructions that may become potentially dangerous).

The ROP compiler may be any ROP compiler known in the art or developed in the future capable of compiling attack gadgets and reporting all available gadgets. In one embodiment, offline analysis tool 2215 utilizes a portfolio approach running a variety of ROP compilers and merging their lists of dangerous gadgets to identify attack gadgets, available gadgets, and instructions that may become potentially dangerous.

After the dangerous and/or potentially dangerous gadgets are identified, the gadgets can be diversified via relocation to thwart an attack. It may not be possible to remove a high-risk gadget entirely from the executable since its instructions may be integral to the program's execution. However, the chronomorphic binary can relocate the gadget with high frequency throughout execution as long as it preserves the control flow of the target program.

In one embodiment, automatic relocation of gadgets is the highest-diversity strategy that the chronomorphic binary offers. The chronomorphic binary allocates an empty block relocation space in the binary, reserved for gadget relocation. Whenever the chronomorphic binary triggers a morph (discussed below), the chronomorphic binary shuffles relocated blocks to random locations in the block relocation space and repairs previous control flow with recomputed jump instructions to the corresponding location in the block relocation space.

For each potentially dangerous relocatable gadget, the chronomorphic binary performs the following procedure to make the gadget relocatable during runtime:

1) Compute the basic block (i.e., a sequence of instructions with exactly one entry and exit point) that contains the gadget;

2) Relocate the byte sequence of the gadget's basic block to an empty area in the block relocation space;

3) Write a jump instruction from the head of the basic block to the new address in the block relocation space;

4) Write nop instructions (e.g., instructions that include the explicit purpose of not changing the state of any of the registers, status flags, or memory that are accessible by the programmer) over the remainder of the gadget's previous basic block, destroying the gadget; and 5) Write the block's byte sequence and the address of the new jump instruction to the morph table.

The morph table now contains enough information to place the gadget-laden block anywhere in the block relocation space and to re-compute the corresponding jump instruction accordingly.

Intuitively, diversity of the binary increases with the size of the block relocation space. For a single gadget block g of with byte-size and block relocation space of size |b|, relocating g adds V(g,b)=|b|−|g| additional program variants.

Relocate multiple gadget blocks G={g0, . . . , g|G|1}, the following number of variants are added:

$$V(G, b) = \prod_{i=0}^{|G|-1}\left(|b| - \sum_{j=0}^{i}|g_j|\right)$$

The probability of guessing all of the relocated gadgets' addresses is therefore 1/V (G, b), which diminishes quickly as the chosen size of the block relocation space increases. In one embodiment, the chronomorphic binary has the following constraints for choosing gadget blocks for relocation:

1) Relocated blocks should not contain a call instruction. When a call instruction is executed, the subsequent instruction's address is pushed onto the stack, and if the calling block is then relocated, execution would return into an arbitrary (incorrect) spot in the block relocation space;

2) Relocated blocks should be at least the size of the jump to the block relocation space, so that Chronomorph has room to write the jump;

3) Relocated blocks should end in an indirect control flow (e.g., ret) instruction; otherwise, we would have to re-compute the control flow instruction at the block's tail at every relocation. Empirically, the vast majority of these blocks end in ret;

4) Relocated gadgets should not span two blocks.

In various other embodiments, the chronomorphic binary uses in-place code randomization (IPCR) strategies to randomize non-relocated instructions. IPCR strategies perform narrow-scope transformations without changing the byte-length of instruction sequences.

A first IPC strategy to compute transformations comprises instruction substitution (IS), which substitutes a single instruction for one or more alternatives. For example, comparisons can be performed in either order, XORing a register with itself is equivalent to MOVing or ANDing zero. These instructions have the same execution semantics, but they change the byte content of the instruction so unintended control flow instructions (e.g., 0xC3=ret) are potentially transformed or eliminated. A single IS adds as many program variants as there are instruction alternatives.

Another IPCR strategy comprises register preservation code reordering (RPCR), which reorders the pop instructions before every "ret" instruction of a function and also reorders the corresponding push instructions at the function head to maintain symmetry. A register preservation code reordering for a single function adds as many variants as there are permutations of push or pop instructions.

In various embodiments, RPCR changes the layout of a function's stack frame, which may render it not continuable. For example, if the control flow enters the function and it preserves register values via PUSHing and then the chronomorphic binary runs RPCR on the function, the control flow will likely POP values into unintended registers and adversely affect program functionality.

Stack-frame diversity (e.g., RPCR) should, but not necessarily, be attempted at runtime if execution cannot continue or re-enter the function (e.g., from an internal call) after a SMC morph operation. In various embodiments, this is enforced analytically with control flow graph (CFG) analysis: if execution can continue within a function "f" from the morph trigger (i.e., if the morph trigger is reachable from f in the CFG), the stack frame of f should not be diversified. After the relocations and/or transformations are performed, the relocations and/or transformations are written to one or more morph tables located outside the chronomorphic binary.

In various embodiments, each morph table is a compact binary file that accompanies the chronomorphic binary (see FIG. 3). Each morph table binary represents packed structs (e.g., MorphPoint structs with internal MorphOption byte sequences). Each MorphPoint represents a decision point (i.e., an IS or RPCR opportunity) where any of the associated MorphOption structs will suffice. Each MorphPoint is stateless (e.g., does not depend on the last choice made for the MorphPoint) and independent of any other MorphPoint so that random choices are safe and ordering of the morph table is not important. The relocation data is a separate portion of the morph table and contains the content of relocatable blocks alongside their corresponding jump addresses. Similar to IPCR operations, relocations are stateless and independent, provided the chronomorph SMC runtime does not overlay them in the block relocation space. After the chronomorphic binary injects SMC capabilities into third-party executables and is capable of diversification, the chronomorphic binary uses triggers to know when to relocate and/or transform the target program code.

The chronomorphic binary, in one embodiment, automatically connects the chronomorph SMC runtime into the target program's control flow to induce diversification of executable memory during runtime. The injection of morph triggers presents a trade-off: morphing too frequently will unnecessarily degrade program performance, whereas morphing too seldom allows wide windows of attack. In one embodiment, morphing occurs at the speed of an input (e.g., once per server request or transaction or user input (or some modulo thereof)).

In various embodiments, the location of the morph trigger(s) in the target program's control flow determines morph frequency. For example, FIG. 4 shows a portion of a control flow graph for an exemplary target program, calling out the getc( ) input function. In FIG. 4, the shaded regions are functions, instruction listings are basic blocks, and edges are control flow edges. As shown in FIG. 4, the chronomorphic binary injects calls to the SMC runtime at the input points or at calling functions with stack-based buffers (which are more likely to contain vulnerabilities through which a ROP attack would begin). In addition, the chronomorphic binary may also include an interface for the application developer to add a specialized MORPH comment in the source code, which is replaced by a morph trigger during the rewriting phase. After offline analysis tool 2215 completes the offline analysis, online execution tool 2220 performs the defense functions.

Online execution tool 2220 comprises computer-executable code for diversifying the executable memory space of the chronomorphic binary during program runtime. Diversification is accomplished by relocating and transforming the instructions of the program code without hindering the performance or functionality of the target program. In other words, the chronomorphic binary executes in the same manner as the original non-chronomorphic variant, except when the morph triggers are invoked. For example, when the first morph trigger is invoked, the chronomorph SMC runtime loads the morph table and seeds its random number generator. In one embodiment, the morph triggers induce a partial morphing (e.g., if performance suffers too much with a full morph). In other embodiments, the morph triggers induce a complete SMC diversification of the in-process executable memory according to the IPCR and relocation data in the morph table:

1) The block relocation space is made writable with mprotect;

2) Relocated basic blocks in the block relocation space are overwritten with nop instructions;

3) Each relocatable block is inserted to a random block relocation space address, and its jump instruction (where the block used to be in the target program's original CFG) is rewritten accordingly;

4) The block relocation space is made executable; and

5) Each MorphPoint is traversed and a corresponding MorphOption is chosen at random and written. Each operation is surrounded by mprotect calls to make the corresponding page writable and then executable.

With reference again to FIG. 2, processor 230 may be any processing system and/or device known in the art or developed in the future. That is, processor 230 is any type of system and/or device capable of executing the instructions comprising defense tool 2210. In other words, processor 230, when executing the instructions comprising defense tool 2210, is configured for performing the functions of offline analysis tool 2215 and online execution tool 2220.

Figure 6:
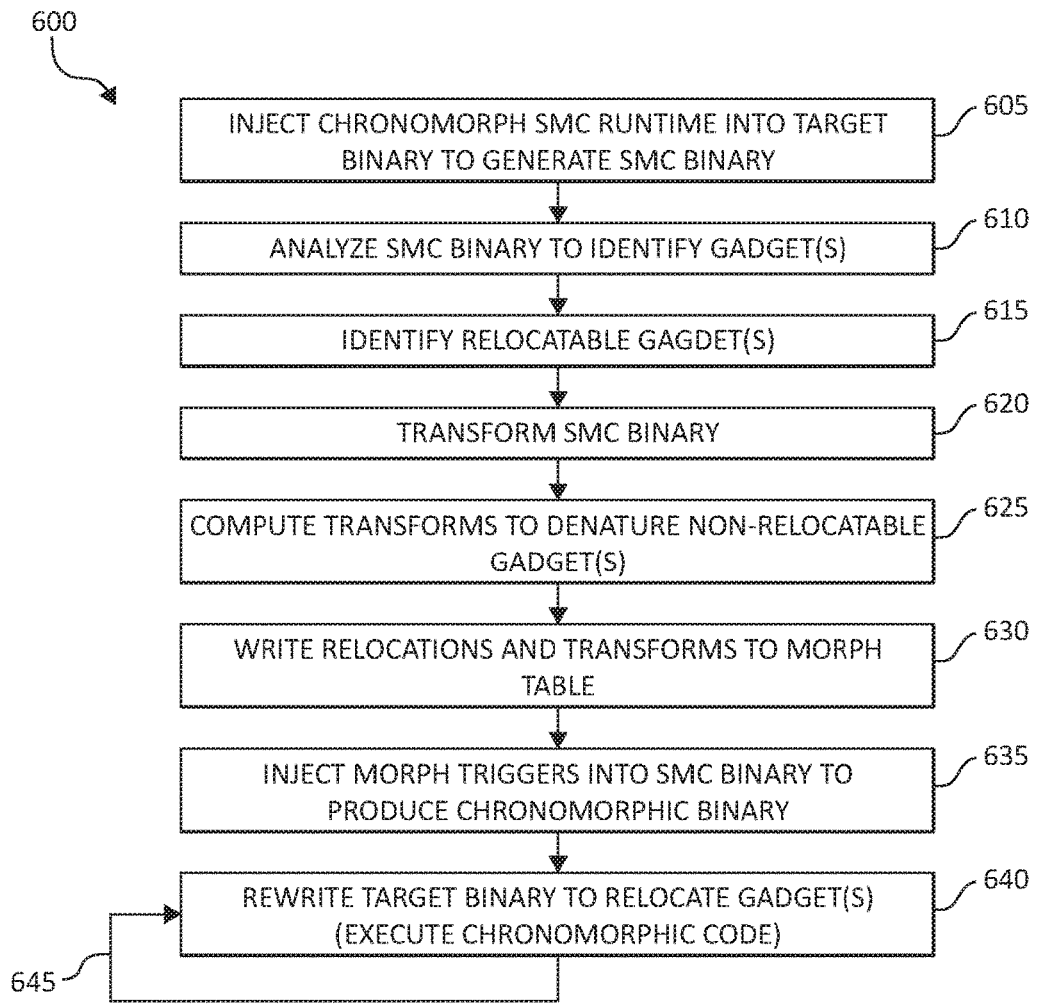
FIG. 6 is a flow diagram illustrating one embodiment of a method for defending against cyber-attacks.

Referring now to FIG. 6, FIG. 6 is a flow diagram of one embodiment of a method 600 for defending against a cyber-attack. At least in the illustrated embodiment, method 600 begins offline by injecting a chronomorph SMC runtime into the binary of a target program binary to produce a SMC binary with SMC functions that are disconnected from the target program's normal control flow (block 605).

Method 600 further comprises analyzing the SMC binary to identify one or more gadgets (block 610). Relocatable gadgets are identified (block 615) and the SMC binary is transformed to make those gadgets relocatable (block 620).

Furthermore, method 600 includes computing instruction-level, semantics-preserving transforms that denature non-relocatable gadgets and the surrounding program code (block 625). The relocations and transforms are written to a morph table outside the chronomorphic binary (block 630) and morph triggers are injected into the SMC binary so that the program will morph itself periodically (block 635), which produces a chronomorphic binary.

During execution of the target program, method 600 comprises rewriting portions of the target program's binary to automatically relocate the gadgets (block 640). The portions of the target program's binary are rewritten such that block 640 is periodically, continually, or substantially continually repeated (arrow 645).

In summary, various embodiments provide methods, systems, and computer-readable storage medium including a computer program product for defending against cyber-attacks are provided. One method comprises receiving, by a processor, program code and automatically generating a chronomorphic binary for the program code. The method further includes storing the chronomorphic binary in an executable memory space and diversifying the executable memory space for the chronomorphic binary during runtime of the program code.

In one embodiment, automatically generating the chronomorphic binary comprises transforming the program code to generate a self-modifying code (SMC) binary, analyzing the SMC binary to identify one or more gadgets that may be relocated, transforming the SMC binary to enable the identified one or more gadgets to be relocatable, writing the one or more gadget relocations to a morph table located external to the chronomorphic binary, and injecting morph triggers into the SMC binary. In a further embodiment, automatically generating the chronomorphic binary further comprises computing instruction-level, semantics-preserving transforms to denature non-relocatable gadgets and surrounding program code and writing the transforms to the morph table that is located external to the chronomorphic binary. Diversifying the executable memory space, in an embodiment, comprises relocating and transforming instructions in the program code during runtime.

In another exemplary embodiment, transforming the program code to generate the SMC binary comprises injecting one or more memory protection functions in the SMC binary and the method further comprises connecting the memory protection functions to a control flow of the program code when the morph triggers are invoked. Injecting the one or more memory protection functions, in one embodiment, comprises linking a source code of the program code and a first chronomorph SMC runtime code to generate a SMC executable module, generating statically-linked SMC executable code by rewriting a statically-linked binary by adding a first segment including a statically-linked chronomorph SMC runtime, and/or generating dynamically-linked SMC executable code. The dynamically-linked SMC executable code is generated by rewriting a dynamically-linked binary via adding chronomorph procedures to to an alternative table, adding objects to a global object table, and extending the dynamically-linked binary with a second segment including a dynamically-linked chronomorph SMC runtime. In one embodiment, injecting the one or more memory protection functions comprises linking a source code of the program code and a first chronomorph SMC runtime code to generate a SMC executable module to generate one of statically-linked SMC executable code and dynamically-linked SMC executable code.

A system comprises memory configured for storing a defense module and a processor connected to the memory. The processor, when executing the defense module, is configured for receiving program code and automatically generating a chronomorphic binary for the program code. The processor is further configured for storing the chronomorphic binary in an executable memory space and diversifying the executable memory space for the chronomorphic binary during runtime of the program code.

In one embodiment, the processor, when automatically generating the chronomorphic binary, is configured for transforming the program code to generate a self-modifying code (SMC) binary, analyzing the SMC binary to identify one or more gadgets that may be relocated, transforming the SMC binary to enable the identified one or more gadgets to be relocatable, writing the one or more gadget relocations to a morph table located external to the chronomorphic binary, and injecting morph triggers into the SMC binary. In a further embodiment, the processor, when automatically generating the chronomorphic binary, is further configured for computing instruction-level, semantics-preserving transforms to denature non-relocatable gadgets and surrounding program code and writing the transforms to the morph table that is located external to the chronomorphic binary. When diversifying the executable memory space, in an embodiment, the processor is configured for relocating and transforming instructions in the program code during runtime.

In another exemplary embodiment, the processor, when transforming the program code to generate the SMC binary, is configured for injecting one or more memory protection functions in the SMC binary and the processor is further configured for connecting the memory protection functions to a control flow of the program code when the morph triggers are invoked. When injecting the one or more memory protection functions, in one embodiment, the processor is configured for linking a source code of the program code and a first chronomorph SMC runtime code to generate a SMC executable module, generating statically-linked SMC executable code by rewriting a statically-linked binary by adding a first segment including a statically-linked chronomorph SMC runtime, and/or generating dynamically-linked SMC executable code. The dynamically-linked SMC executable code is generated by the processor by rewriting a dynamically-linked binary via adding chronomorph procedures to to an alternative table, adding objects to a global object table, and extending the dynamically-linked binary with a second segment including a dynamically-linked chronomorph SMC runtime. In one embodiment, when injecting the one or more memory protection functions, the processor is configured for linking the source code of the program code and the first chronomorph SMC runtime code to generate a SMC executable module and to generate one of statically-linked SMC executable code and dynamically-linked SMC executable code.

One computer program product for defending against cyber-attacks comprises computer code for receiving, by a processor, program code and computer code for automatically generating a chronomorphic binary for the program code. The computer program product further comprises computer code for storing the chronomorphic binary in an executable memory space and computer code for diversifying the executable memory space for the chronomorphic binary during runtime of the program code.

In one embodiment, the computer code for automatically generating the chronomorphic binary comprises computer code for transforming the program code to generate a self-modifying code (SMC) binary, computer code for analyzing the SMC binary to identify one or more gadgets that may be relocated, computer code for transforming the SMC binary to enable the identified one or more gadgets to be relocatable, computer code for writing the the one or more gadget relocations to a morph table located external to the chronomorphic binary, and computer code for injecting morph triggers into the SMC binary. In a further embodiment, the computer code for automatically generating the chronomorphic binary further comprises computer code for computing instruction-level, semantics-preserving transforms to denature non-relocatable gadgets and computer code for surrounding program code and computer code for writing the transforms to the morph table that is located external to the chronomorphic binary. The computer code for diversifying the executable memory space, in an embodiment, comprises computer code for relocating and transforming instructions in the program code during runtime.

In another exemplary embodiment, the computer code for transforming the program code to generate the SMC binary comprises computer code for injecting one or more memory protection functions in the SMC binary and the computer-readable storage medium further comprises computer code for connecting the disconnected memory protection functions to a control flow of the program code when the morph triggers are invoked. The computer code for injecting the one or more memory protection functions, in one embodiment, comprises computer code for linking a source code of the program code and a first chronomorph SMC runtime code to generate a SMC executable module, computer code for generating statically-linked SMC executable code by rewriting a statically-linked binary by adding a first segment including a statically-linked chronomorph SMC runtime, and/or generating dynamically-linked SMC executable code. The dynamically-linked SMC executable code is generated by computer code for rewriting a dynamically-linked binary via adding chronomorph procedures to to an alternative table, computer code for adding objects to a global object table, and computer code for extending the dynamically-linked binary with a second segment including a dynamically-linked chronomorph SMC runtime. In one embodiment, the computer code for injecting the one or more memory protection functions comprises computer code for linking a source code of the program code and a first chronomorph SMC runtime code to generate a SMC executable module to generate one of statically-linked SMC executable code and dynamically-linked SMC executable code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium such as, for example, non-transitory computer-readable signal medium or a non-transitory computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowcharts and/or block diagrams in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

The invention claimed is:

1. A method for defending against cyber-attacks, comprising;
   receiving, by a processor, a program code;
   automatically generating a chronomorphic binary for the program code;
   storing the chronomorphic binary in an executable memory space; and
   diversifying the executable memory space for the chronomorphic binary during runtime of the program code;
   wherein automatically generating the chronomorphic binary comprises:
   transforming the program code to generate a self-modifying code (SMC) binary:
   analyzing the SMC binary to identify one or more gadgets eligible for relocation;
   transforming the SMC binary to enable the identified one or more gadgets to be relocatable;
   writing the one or more gadget relocations to a morph table located external to the chronomorphic binary; and
   injecting morph triggers into the SMC binary.

2. The method of claim 1, wherein automatically generating the chronomorphic binary further comprises:
   computing instruction-level, semantics-preserving transforms to denature non-relocatable gadgets and surrounding program code; and
   writing the transforms to the morph table that is located external to the chronomorphic binary.

3. The method of claim 2, wherein diversifying the executable memory space comprises relocating and transforming instructions in the program code during runtime.

4. The method of claim 1, wherein:
   transforming the program code to generate the SMC binary comprises injecting one or more disconnected memory protection functions into the SMC binary; and
   the method further comprising connecting the memory protection functions to a control flow of the program code when the morph triggers are invoked.

5. The method of claim 4, wherein injecting the one or more disconnected memory protection functions comprises one of:
   linking a source code of the program code and a first chronomorph SMC runtime code to generate a SMC executable module;
   generating statically-linked SMC executable code by rewriting a statically-linked binary by adding a first segment including a statically-linked chronomorph SMC runtime; and
   generating dynamically-linked SMC executable code by rewriting a dynamically-linked binary by:
      adding chronomorph procedures to an alternative table,
      adding objects to a global object table, and
      extending the dynamically-linked binary with a second segment including a dynamically-linked chronomorph SMC runtime.

6. The method of claim 5, wherein injecting the one or more disconnected memory protection functions comprises linking the source code of the program code and the first chronomorph SMC runtime code to generate the SMC executable module and to generate one of the statically-linked SMC executable code and the dynamically-linked SMC executable code.

7. A system for defending against cyber-attacks, comprising:
   memory configured for storing a defense module; and
   a processor coupled to the memory, wherein the processor, when executing the defense module, is configured for:
      receiving a program code,
      automatically generating a chronomorphlc binary for the program code,
      storing the chronomorphic binary in an executable memory space, and diversifying the executable memory space for the chronomorphic binary during runtime of the program code;
      wherein, when automatically generating the chronomorphic binary, the processor is configured for:
      transforming the program code to generate a self-modifying code (SMC) binary; analyzing the SMC binary to identify one or more gadgets eligible for relocation;
      transforming the SMC binary to enable the identified one or more gadgets to be relocatable;
      writing the one or more gadget relocations to a morph table located external to the chronomorphic binary; and
      injecting morph triggers into the SMC binary.

8. The system of claim 7, wherein the processor, when automatically generating the chronomorphic binary, is further configured for:
   computing instruction-level, semantics-preserving transforms to denature non-relocatable gadgets and surrounding program code; and
   writing the transforms to the morph table that is located external to the chronomorphic binary.

9. The system of claim 8, wherein the processor, when diversifying the executable memory space, is configured for relocating and transforming instructions in the program code during runtime.

10. The system of claim 9, wherein:
the processor, when transforming the program code to generate the SMC binary, is configured for injecting one or more disconnected memory protection functions in the SMC binary; and
the processor is further configured for connecting the disconnected memory protection functions to a control flow of the program code when the morph triggers are invoked.

11. The system of claim 10, wherein the processor, when injecting the one or more disconnected memory protection functions, is configured for performing one of:
linking a source code of the program code and a first chronomorph SMC runtime code to generate a SMC executable module;
generating statically-linked SMC executable code by rewriting a statically-linked binary by adding a first segment including a statically-linked chronomorph SMC runtime; and
generating dynamically-linked SMC executable code by rewriting a dynamically-linked binary by:
adding chronomorph procedures to an alternative table, adding objects to a global object table, and
extending the dynamically-linked binary with a second segment including a dynamically-linked chronomorph SMC runtime.

12. The system of claim 11, wherein the processor, when injecting the one or more disconnected memory protection functions, is configured for linking the source code of the program code and the first chronomorph SMC runtime code to generate the SMC executable module and to generate one of statically-linked SMC executable code and dynamically-linked SMC executable code.

13. A non-transitory computer-readable storage medium including a computer program product for defending against cyber-attacks, comprising:
computer code for receiving, by a processor, a program code;
computer code for automatically generating a chronomorphic binary for the program code;
computer code for storing the chronomorphic binary in an executable memory space; and
computer code for diversifying the executable memory space for the chronomorphic binary during runtime of the program code;
wherein the computer code for automatically generating the chronomorphic binary comprises:
computer code for transforming the program code to generate a self-modifying code (SMC) binary;
computer code for analyzing the SMC binary to identify one or more gadgets eligible for relocation;
computer code for transforming the SMC binary to enable the identified one or more gadgets to be relocatable;
computer code for writing the one or more gadget relocations to a morph table located external to the chronomorphic binary; and
computer code for injecting morph triggers into the SMC binary.

14. The computer-readable storage medium of claim 13, wherein the computer code for automatically generating the chronomorphic binary further comprises:
computer code for computing instruction-level, semantics-preserving transforms to denature non-relocatable gadgets and surrounding program code; and
computer code for writing the transforms to the morph table that is located external to the chronomorphic binary.

15. The computer-readable storage medium of claim 14, wherein the computer code for diversifying the executable memory space comprises computer code for relocating and transforming instructions in the program code during runtime.

16. The computer-readable storage medium of claim 13, wherein:
the computer code for transforming the program code to generate the SMC binary comprises computer code for injecting one or more memory protection functions in the SMC binary; and
the computer-readable storage medium further comprises computer code for connecting the disconnected memory protection functions to a control flow of the program code when the morph triggers are invoked.

17. The computer-readable storage medium of claim 16, wherein the computer code for injecting the one or more memory protection functions comprises one of:
computer code for linking a source code of the program code and a first chronomorph SMC runtime code to generate a SMC executable module;
computer code for generating statically-linked SMC executable code by rewriting a statically-linked binary by adding a first segment including a statically-linked chronomorph SMC runtime; and
computer code for generating dynamically-linked SMC executable code by rewriting a dynamically-linked binary by:
adding chronomorph procedures to an alternative table, adding objects to a global object table, and
extending the dynamically-linked binary with a second segment including a dynamically-linked chronomorph SMC runtime.

* * * * *